Aug. 13, 1963
N. A. NELSON
3,100,396
LIQUID VOLUME COMPENSATOR
Filed Dec. 16, 1959
3 Sheets-Sheet 1
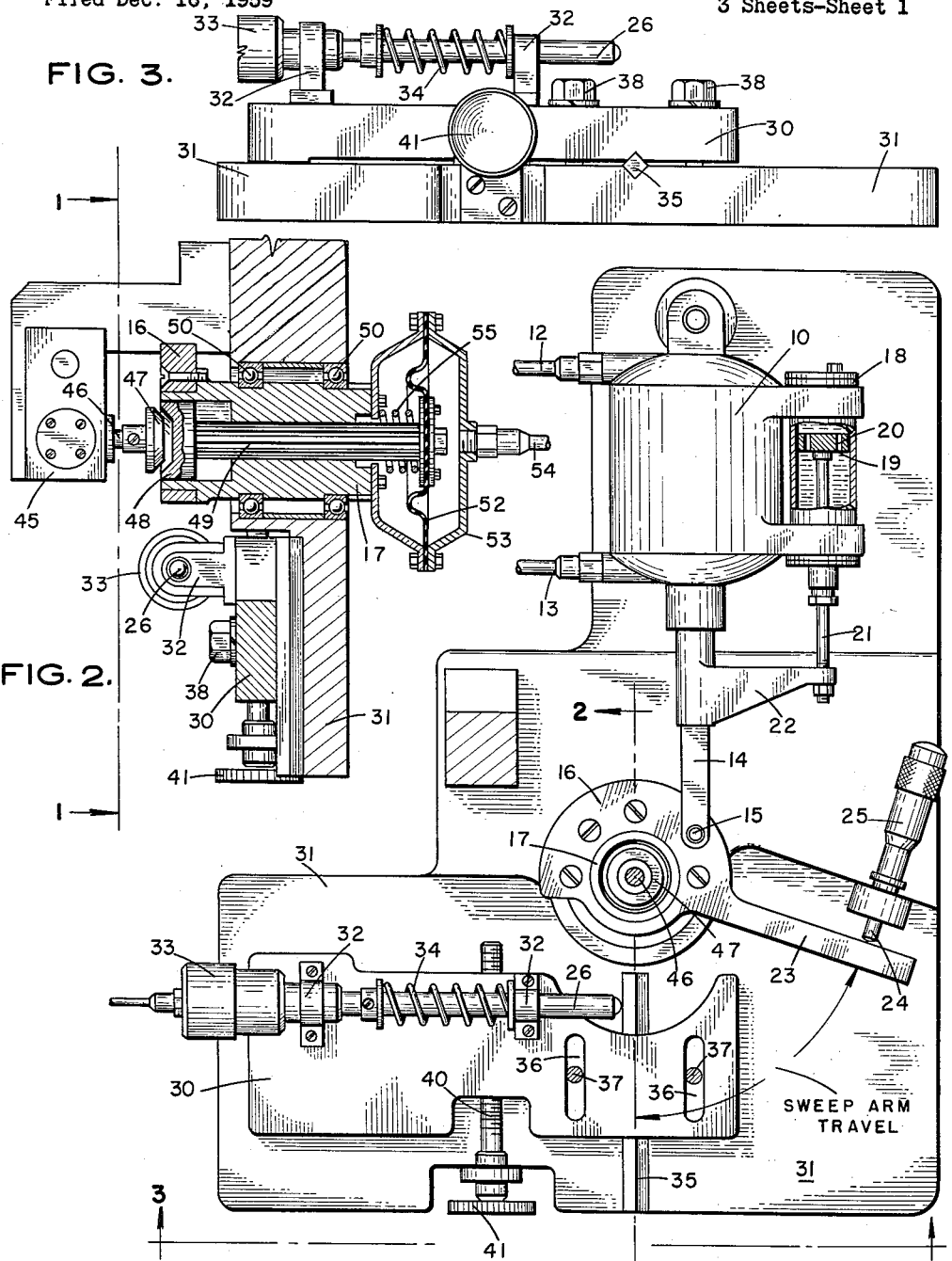
INVENTOR.
NORMAN A. NELSON,
BY
John A. Schneider
ATTORNEY.

Aug. 13, 1963

N. A. NELSON 3,100,396

LIQUID VOLUME COMPENSATOR

Filed Dec. 16, 1959

INVENTOR.
NORMAN A. NELSON,
BY
John A. Schneider
ATTORNEY.

Aug. 13, 1963
N. A. NELSON
3,100,396
LIQUID VOLUME COMPENSATOR
Filed Dec. 16, 1959
3 Sheets-Sheet 3
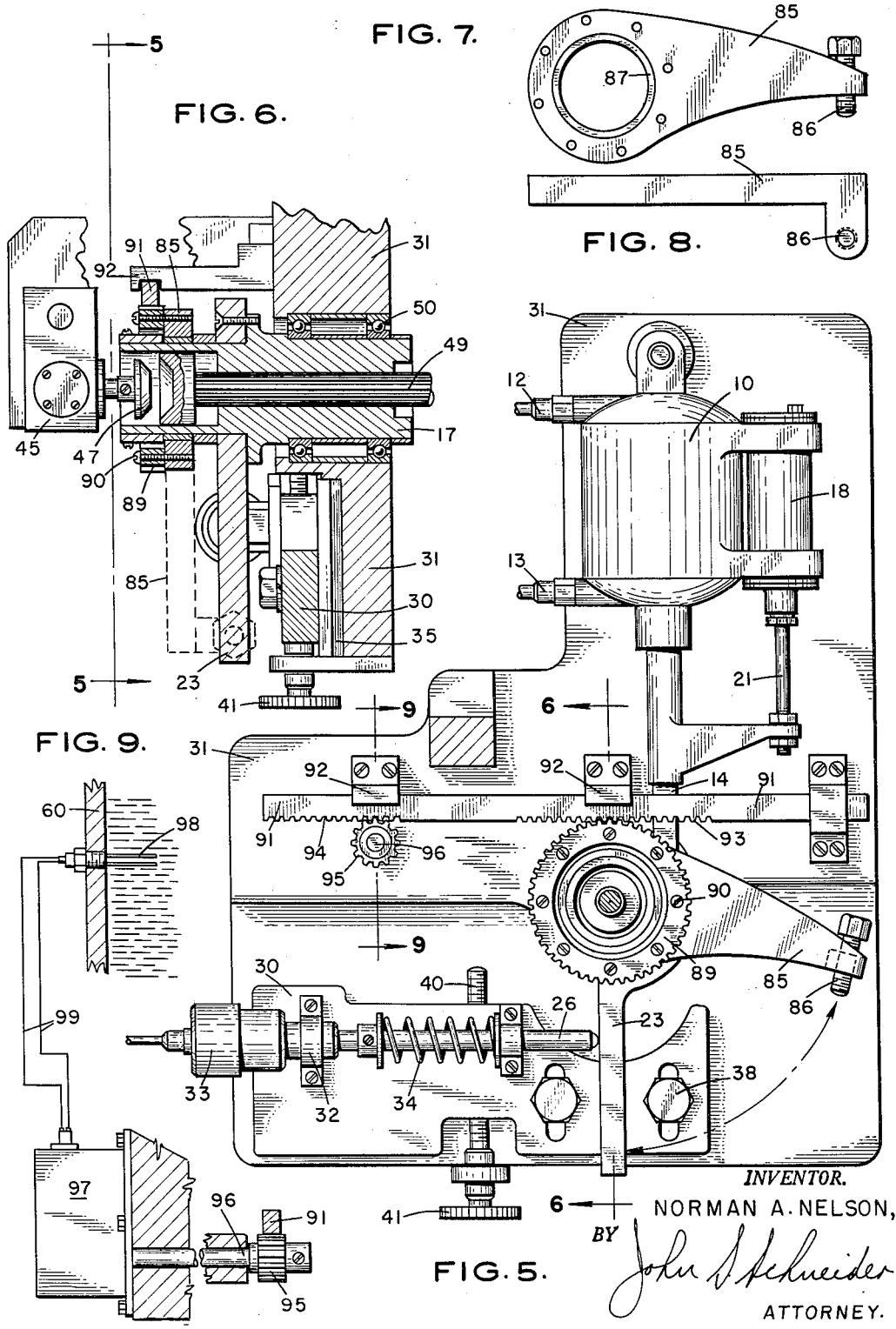
INVENTOR.
NORMAN A. NELSON,
BY John S Schneider
ATTORNEY.

United States Patent Office 3,100,396
Patented Aug. 13, 1963

3,100,396
LIQUID VOLUME COMPENSATOR
Norman A. Nelson, South Houston, Tex., assignor, by mesne assignments, to Jersey Production Research Company, Tulsa, Okla., a corporation of Delaware
Filed Dec. 16, 1959, Ser. No. 859,966
1 Claim. (Cl. 73—223)

This invention concerns apparatus for correcting the volume of liquid measured in a metering tank to correct for differences between the actual volume of the tank and a standard volume or to compensate for volume differences of the liquid being measured resulting from changes in a factor or factors such as temperature, basic sediment and water (BS & W) gravity, or flashing, that affect the measurement of the liquid.

Different embodiments of the invention provide apparatus whereby (1) two variable corrections (2) one variable correction and one constant correction (3) one variable correction, or (4) one constant correction may be applied to the liquid being measured.

Until recently, endeavors to correct or compensate for the volume differences of a liquid being measured in a metering tank, involved changing the actual volume of the meter tank. In U.S. patent application Ser. No. 645,264, entitled, "Temperature Compensator for Intermittent Dump Meter," filed March 11, 1957, by Stephen S. Brown, apparatus is disclosed which provides for compensating for volume differences of a liquid or for differences in tank volumes by controlling the amount of rotation of a counter shaft of a registering or recording counter device. In this apparatus a constant correction for a volumetric change in the liquid may be applied to the counter by rotation of the counter shaft a specific amount to compensate for a constant volumetric difference between the volume of the tank and a standard volume or if the correction is one which varies in proportion to variations in a factor or factors that affect measurement of the liquid, it may be applied to the counter by rotation of the counter shaft an amount proportional to changes in the factor. The present invention is an improvement over apparatus of this nature.

The apparatus of the invention is especially useful in the metering of crude oil; however, it is also useful in the measurement of other liquids.

Thus, a primary object of the present invention is to provide improved apparatus for accurately compensating for volume differences of a liquid resulting from changes in a factor that affects the measurement of the liquid or for a volume variation caused by a selected correction to be applied. In either case the compensation may be automatically made in each fill-discharge cycle of a fill-dump type meter.

In brief, the invention comprises linearly movable means adapted to move selected amounts representative of selected volumes of said liquid, rotatable or pivotal means connected to said linearly movable means, the amount of rotation of said rotatable means being proportional to the amount of linear movement of said linearly movable means, means for limiting the amount of movement of said rotatable means in response to change in the factor (or the tank volume), means releasably connected to said rotatable means adapted to register the amount of rotation of said rotatable means. Fluid pressure may be provided for moving said movable means and also for engaging and disengaging the rotatable means and the registering means. Additionally, one aspect of the invention, when it is to be used in conjunction with dump-type meters, the valves of which are operated by a pneumatic pilot system which also operates the compensator apparatus, is a "fail-safe" pneumatic interlock arrangement to prevent double counting on the registering means.

The above object and other objects of the invention will be apparent from a more detailed description of the invention and its operation when taken in conjunction with the drawings wherein:

FIG. 1 is a partly sectional view of one embodiment of the invention;

FIG. 2 is a view taken on lines 2—2 of FIG. 1;

FIG. 3 is a view taken on lines 3—3 of FIG. 1;

FIG. 5 is a partly sectional view of another embodiment of the apparatus of the invention;

FIG. 6 is a view taken on lines 6—6 of FIG. 5;

FIGS. 7 and 8 are two views of the movable arm of FIG. 5; and

FIG. 9 is a view taken on lines 9—9 of FIG. 5 and also showing the connection of the probe and the metering tank.

Figure 4:
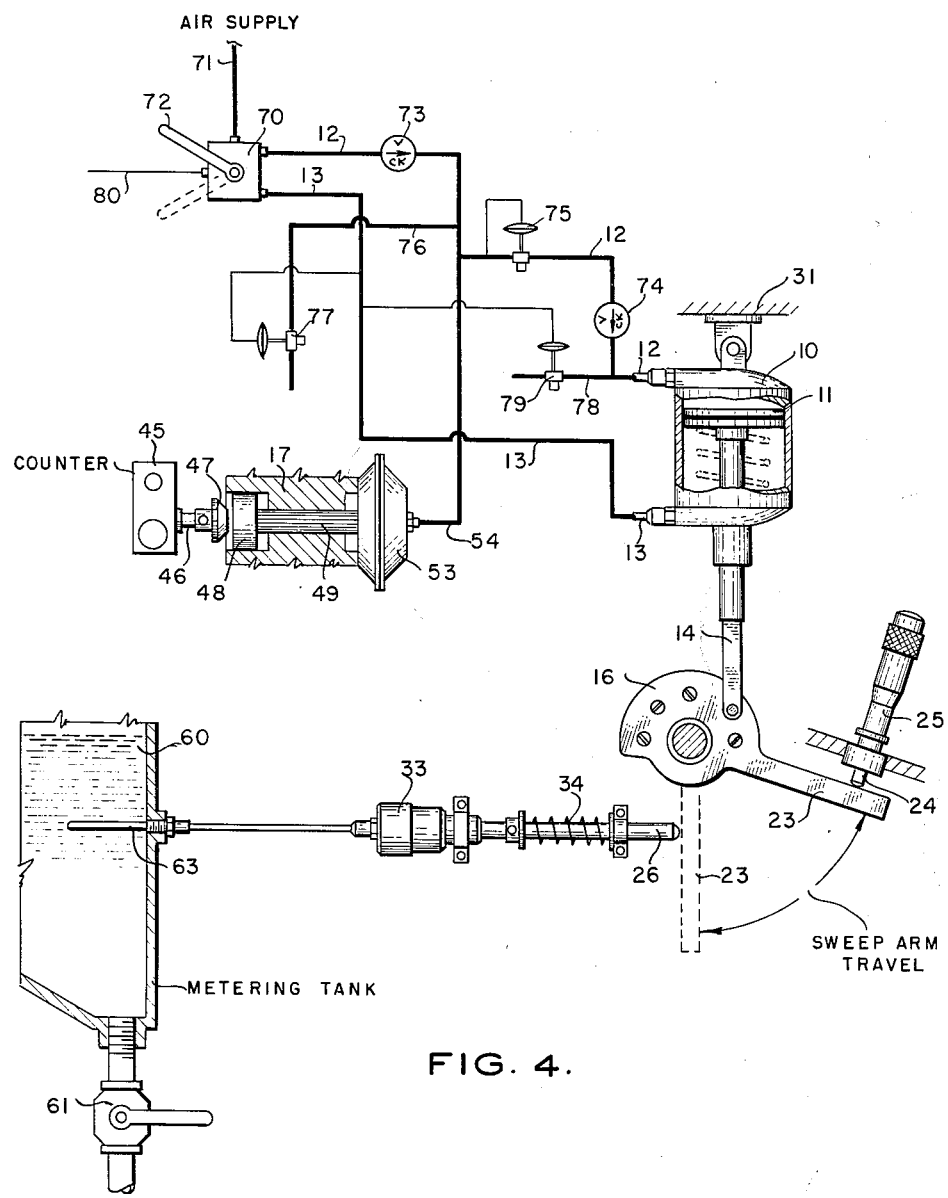
FIG. 4 is a schematic view of the operation of the embodiment of FIGS. 1 to 3 in cooperation with a metering tank and illustrating also the interlock arrangement of the pneumatic system.

Referring to the drawings in greater detail, in FIGS. 1–4 is shown an actuating cylinder 10 in which is arranged a piston 11, as shown in FIG. 4, reciprocal in cylinder 10 by means of fluid pressure supplied through conduits 12 and 13. A crank 14 connected at one end to and reciprocal with movement of piston 11 is connected at its other end to a pin 15 attached to a circular rotatable compensator drive plate 16, which, in turn, is connected directly to a counter drive shaft 17. Instead of crank 14 and pin 15, a rack gear and pinion may be used to translate linear to rotational movement. A dampening cylinder 18 containing a piston 19 having ports 20 is mounted adjacent cylinder 10. A piston rod 21 and an arm 22 interconnect piston 19 and crank 14. A sweep arm 23 connects to and extends from one side of compensator drive plate 16. The travel of sweep arm 23 is confined between an adjustable fixed stop 24, which may be adjustable by means of a micrometer element 25, and a variable factor actuated probe or stop 26.

As seen in both FIGS. 1 and 3, the variable factor actuated probe is arranged on a movable carriage or base 30, which, in turn, is mounted on a support 31. The movable probe 26 is supported on base 30 by means of brackets 32. The factor control transmits fluid movements which vary in response to changes in the factor to a fluid motor 33 which contains a diaphragm or piston to which probe 26 is connected. A spring 34 surrounds probe 26 and biases it to the left, as seen in the figures. Base 30 and support 31 are formed with cooperating grooves in which are arranged a guide key 35. Oblong openings 36 formed in carriage 30 have extending therethrough screws 37 which are mounted in support 31. Nuts 38 screw-threadedly engage with screws 37 to secure base 30 to support 31. An adjusting screw 40 provided with a knurled knob 41 for adjusting probe 26 engages the underside of base 30 to cause movement of the base 30 relative to support 31 upon rotation of knob 41. Adjustment of the probe 26 toward and away from the center line of shaft 17 or the pivot point of arm 23, through this arrangement, permits minute control of the amount of rotation of shaft 17 because the greater the travel of the arc swept by a point on sweep arm 23, the less effect the amount of movement to the right or left, as shown, of probe 26 will have on the rotation of shaft 17.

In FIG. 2 is shown a rotation type counter 45 provided with a rotatable shaft 46 to which is connected one plate or face 47 of an engageable-disengageable clutch mechanism. The other face 48 of the clutch mechanism is mounted on a shaft 49 which is splined to, rotatable with, and longitudinally movable within shaft 17, which, in turn, is mounted for rotation on bearings 50 arranged on support 31. The other end of shaft 49 connects to one side of a diaphragm 52 arranged in a diaphragm housing 53. The other side of diaphragm 52 fluidly communicates with a fluid pressure conduit 54. A spring 55 biases diaphragm 52 against the action of fluid pressure supplied through conduit 54. When clutch faces 47 and 48 are engaged, rotation of shaft 17 a particular amount rotates shaft 46 the same amount. The record or counter output of counter 45 may be any desired mathematical relationship to the amount of rotation of shaft 46.

In FIG. 4 operation of the apparatus in conjunction with a factor such as temperature compensation and a dump-type meter system is illustrated. The factor control mechanism may be any desired temperature sensitive device which moves probe 26 in response to changes of temperature (or other factor) of a liquid in a metering tank 60 provided with a dump-fill valve 61. For example, the control may be exercised by expansion and contraction of fluid in a temperature sensitive bulb 63 extending into tank 60 in response to changes in temperature of the liquid being measured which moves a diaphragm (or piston) arranged in motor 33 and to which probe 26 is connected.

The pneumatic pilot system includes a valve means 70 which connects a fluid supply conduit 71 (to which is connected a source of fluid supply, not shown) to conduits 12 and 13, which, in turn, fluidly communicate with actuating cylinder 10. When the apparatus is used in conjunction with the metering tank temperature compensation illustration, it is desired to rotate the shaft 46 of counter 45 when bulb 63 is submerged and preferably when the tank is completely full. Thus, the measurement may be made when the tank begins to dump. A handle 72 connected to valve means 70 has an upper dump and a lower fill position. Conduit 12 is provided with a check valve 73 adapted to permit fluid flow to cylinder 10 but to prevent flow of fluid back to valve means 70. A similarly operating check valve 74 also is arranged in conduit 12, and between valves 73 and 74, a back pressure diaphragm type valve 75, adapted to open conduit 12 to permit flow of fluid therethrough when a set pressure, e.g., 16 p.s.i. is reached, is also positioned in conduit 12. Conduit 54 fluidly communicates one side of diaphragm housing 53 and conduit 12 between check valve 73 and back pressure valve 75. Also, a vent conduit 76 connects to conduit 12 between valves 73 and 75. A diaphragm type relief valve 77, which is set to open and exhaust conduit 76, conduit 54, and conduit 12 when the pressure in conduit 13 reaches a lesser pressure than the actuating pressure for valve 75, e.g., 10 p.s.i., is arranged in conduit 76. Also, a conduit 78 fluidly communicates with conduit 12 between valve 74 and cylinder 10. Conduit 78 is provided with a diaphragm type relief valve 79, which is adapted to open and exhaust conduits 78 and 12 when the pressure in conduit 13 is greater than the actuating pressure for valve 75, e.g., 18 p.s.i. If desired, the portion of conduit 13, shown in dotted lines in FIG. 4, may be omitted, and the piston or diaphragm in cylinder 10 returned to its initial position during the fill cycle of the meter by means of a spring or other biasing element, as shown in dotted lines in FIG. 4. The check valves 73 and 74 insure that the apparatus fails safe. That is, in the event of failure of pressure in any part of the pilot pressure system the clutch face 48 will remain in position and the position of arm 23 will remain fixed. When pressure is reapplied to conduit 12, the system will continue in sequence and no erroneous record will be made.

In operation, when it is desired to take a measurement as, for example, during the dump cycle of the meter, handle 72 is moved to the "up" position, as shown, and fluid pressure from a fluid supply is transmitted through conduit 71 and valve means 70 and conduit 12 to actuating cylinder 10 and fluid pressure is released from conduit 13 through a vent line 80. Fluid pressure acting on the diaphragm in actuating cylinder 10 moves crank 14 downwardly which causes plate 16 connected to crank 14 through pin 15 to rotate which, in turn, rotates arm 23. As seen in solid lines, the initial position of arm 23 is adjacent the micrometer adjustable stop 24. Arm 23 is maintained against this stop by fluid pressure acting on the underside of the piston 11. Probe 26, as indicated by the dotted line illustration of arm 23, prevents further rotative movement of arm 23. The position of stop 26 is dependent upon the temperature of the liquid within tank 60. The fluid in bulb 63 expands or contracts depending upon whether the temperature of the liquid in tank 60 is above or below a standard temperature. Expansion or contraction of the fluid (e.g., mercury) in bulb 63 causes a diaphragm in motor 33 to move probe 26 against the bias of spring 34 to maintain the probe or stop 26 at a particular position at a specified standard temperature. When the temperature within tank 60 increases, an increased movement of the diaphragm in motor 33 moves probe 26 in the righthand direction, as seen in FIG. 4. Movement in this direction shortens the travel of arm 23. Contrariwise when the fluid in bulb 63 contracts a decreased movement of the diaphragm in motor 33 moves probe 26 in the lefthand direction, as shown in FIG. 4. Probe 26 in its new position permits a longer travel for arm 23.

As a particular example with probe 26 positioned for a standard 60° F. temperature within tank 60, tank 60 is filled with liquid, the temperature of which by means of bulb 63 and motor 33 varies the position of probe 26, which, in turn, affects the travel of arm 23. If the temperature of the liquid in the tank 60 were 80° F., the correction required would be approximately one percent.

To achieve rotation of counter 45 at the proper time, the fluid pressure signal applied through conduit 12 also acts upon diaphragm 52 through conduit 54 and moves shaft 49 to the lefthand position against the bias of spring 55 until the clutch elements 47 and 48 are engaged. When engaged, rotation of arm 23 rotates plate 16 which is, in turn, secured to shaft 17 to which shaft 49 is splined and, consequently, rotation of counter shaft 46 of counter 45 is effected. By the one percent correction, the counter would register .99 revolution and the counter 45 then would read 0.99 tankfuls or barrels or other unit of measure employed. Similarly, a decreased temperature of the liquid in tank 60 would increase the length of travel of arm 23 which would, in turn, increase the amount of rotation of counter shaft 46 and the counter would register more than one revolution thereby correcting for a decreased and a consequent contracted volume of liquid in tank 60.

The check valve arrangement is designed to have the meter fail safe in case the pneumatic system fails. The particular diaphragm valves are used to insure that the clutch mechanism engages prior to rotation of the counter shaft and that the clutch disengages prior to exhausting pressure from the actuating cylinder.

In the embodiment of the invention shown in FIGS. 1 to 3 and described with regard to FIG. 4, one stop, 24, was described as an adjustable fixed stop and the position of the other stop 26 was described as varying in accordance with variation in a factor that affects the measurement of the volume of liquid as, for example, temperature. However, this apparatus may be used as a volume compensator; that is, where the movement or travel of arm 26 between two fixed stops is adjusted to compensate for a particular volume calibration of a tank. The operation of the clutch mechanism and of the operating cylinder are the same.

In FIGS. 5 to 9, a different embodiment is shown. In this arrangement, two variable stops are employed. One may be used, for example, to compensate for volume differences of a liquid caused by temperature and the other may be used to compensate for volume differences of a liquid caused by, for example, BS & W.

The apparatus is similar to the apparatus of FIGS. 1 to 3 except for the adjustable fixed stop element. Instead of a fixed stop, a movable arm 85, the free end of which is provided with a screw adjustable stop 86 is mounted on shaft 17. Arm 85 is shown more clearly in FIGS. 7 and 8. A sleeve bearing 87 is provided to permit shaft 17 to rotate relative to arm 85. A pinion 89 is secured to arm 85 by means of screws 90. A linearly movable rack gear 91 is secured to base 31 by means of brackets 92. Rack gear 91 is provided with gear teeth 93 adjacent pinion 89 and gear teeth 94 spaced from gear teeth 93 and engageable with a pinion 95.

As seen more clearly in FIG. 9, pinion 95 is mounted on a rotatable shaft 96 which connects to a control housing 97 which, in turn, is connected to tank 60 by leads 99 connected to the BS & W sensitive probe 98 extending into the liquid of tank 60. Control housing 97 contains known instrumentation for converting capacitance to displacement.

An increase in the BS & W content of the oil being metered causes signals to be transmitted from element 98 through leads 99 to the instrumentation in housing 97 which, in turn, rotates shaft 96 and pinion 95. As seen in FIG. 5, pinion 95 rotates clockwise which moves rack gear 91 to the right, which, in turn, rotates pinion 89 clockwise and moves arm 85 and stop 86 clockwise to shorten the travel of arm 23 and thereby register on counter 45 a lesser amount of oil than the tank holds depending upon the amount of BS & W. As indicated in FIG. 5, the extreme upper position of stop 86 means zero percent BS & W and as the arm moves clockwise in response to clockwise rotation of pinion 95 the percent BS & W increases. This is a unique feature of the BS & W compensator portion of the apparatus in that it is able to compensate for any range BS & W content from zero to 100 percent. However, the invention is not to be construed as limited to a stop which measures only BS & W content. Either of the actuating factors can be interchanged for either of the stops or additional factors may be substituted, such as the flashing factor or the gravity factor, etc.

The BS & W correction may be automatically applied by either a density sensitive device or by an electrical capacitance measurement. In the latter which is that illustrated in FIG. 9, the compensation of the liquid measured varies with the water content of the oil. The flash correction factor may be placed in the apparatus as a constant change or if the meter is operated at varying pressures, automatic means may be provided, such as the use of a pressure sensitive device which varies the correction applied to the counter. The flash correction may be used when, for example, one barrel of oil is metered at a 100 lb. p.s.i. pressure and then later flashed to atmospheric pressure. In this instance, only .98 barrel of oil results. Thus, 0.2 barrel of oil is lost during the flash operation and the oil measured shrinks. To compensate for this loss, the barrel of oil is measured at the higher pressure and the amount of oil obtainable if the oil were measured at atmospheric pressure is recorded. In the apparatus of the invention to compensate for this loss, the travel of the movable arm may be limited so that the reduced amount of oil may be measured on the counter.

The term "liquid" as used herein means primarily a liquid phase with or without a small amount of dissolved or entrained gases.

The apparatus in all embodiments has been described with regard to manual operation of the fluid supply to the cylinder 10. However, it is to be understood that the invention is readily employable in automatic metering operations. For example, the fluid supply valve means 45 can be connected to a control system whereby a fluid pressure signal may be transmitted to conduit 12 when tank 60 has filled to record or register a measured volume of liquid and a pressure signal may be transmitted to conduit 13 when tank 60 has emptied in order to reposition or reset arm 23. An example of an automatic meter cycling operation is found in U.S. patent application Ser. No. 588,687, filed June 1, 1956, entitled "Fluid Sampler," by William A. Pitts, wherein a fluid sampler is actuated similarly to the automatic piston actuation contemplated by the present device.

The compensator of the invention eliminates the effect of inertial forces which may cause the counter to rotate and thereby register after the driving mechanism has stopped. By use of the rotational type travel arm and the engageable-disengageable clutch mechanism, the need for speed control braking devices and frictional measures to reduce the effect of inertial forces has been eliminated. In the embodiment wherein two variables are employed, the only place that is subject to wear which would affect the accuracy of the compensator is the pinion and plate bearing.

Having fully described the operation, objects, and elements of my invention, I claim:

Apparatus for correcting the volume of liquid measured in a metering tank to compensate for volume differences of the liquid resulting from changes in factors that affect measurement of the liquid comprising:
a rotatable shaft;
a plate arranged on said shaft for rotation therewith;
a sweep arm connected to said plate;
a linearly movable arm connected to said plate adapted to rotate said plate;
first stop means adapted to prevent movement of said sweep arm upon movement of said sweep arm a selected distance in one circumferential direction;
second stop means adapted to prevent further movement of said sweep arm upon movement of said sweep arm a sufficient distance in an opposite circumferential direction;
means responsive to changes in one of said factors adapted to move said first stop means to increase or decrease travel of said sweep arm;
means responsive to changes in another factor adapted to move said second stop means to increase or decrease travel of said sweep arm;
a rotation counter adapted to measure the amount of rotation of said shaft between said first and second stop means;
a cylinder;
a piston arranged to reciprocate in said cylinder and connected to said linearly movable arm;
a source of fluid pressure;
means connecting said source of fluid pressure to said cylinder to effect reciprocation of said piston and said linearly movable arm;
means releasably engaging said rotation counter and said shaft; and
means connected to said shaft adapted to move said shaft into and out of engagement with said counter.

References Cited in the file of this patent
UNITED STATES PATENTS

| | | |
|---|---|---|
| 844,958 | Riggs | Feb. 19, 1907 |
| 2,438,935 | Marsh | Apr. 6, 1948 |
| 2,806,374 | Granberg | Sept. 17, 1957 |
| 2,851,014 | Healy | Sept. 9, 1958 |
| 2,876,641 | Brown | Mar. 10, 1959 |